(12) United States Patent
Michel et al.

(10) Patent No.: US 9,120,020 B2
(45) Date of Patent: Sep. 1, 2015

(54) MATCHMAKING IN MULTIPLAYER GAMING

(71) Applicant: Microsoft Corporation, Redmond, WA (US)

(72) Inventors: Theodore L. Michel, Bellevue, WA (US); Paul Lyttle, Bothell, WA (US); Jefferson W. Ng, Seattle, WA (US); Micheal Dunn, Seattle, WA (US); Edmund Samuel Victor Pinto, Duvall, WA (US); Vance O'Neill, Woodinville, WA (US); Eric Heutchy, Carnation, WA (US); Rankin J. Kern, Seattle, WA (US); David A. Straily, Bellevue, WA (US); Stephen Paul Dolan, Redmond, WA (US); Justin Brown, Seattle, WA (US); Praneeth Kallu, Redmond, WA (US); Brahmnes Tsz Foon Fung, Redmond, WA (US); Vincent Bannister, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 29 days.

(21) Appl. No.: 13/802,096

(22) Filed: Mar. 13, 2013

(65) Prior Publication Data
US 2014/0274402 A1 Sep. 18, 2014

(51) Int. Cl.
*A63F 9/24* (2006.01)
*A63F 13/00* (2014.01)
(Continued)

(52) U.S. Cl.
CPC ........... *A63F 13/12* (2013.01); *A63F 2300/407* (2013.01); *A63F 2300/513* (2013.01); *A63F 2300/5566* (2013.01); *A63F 2300/5593* (2013.01); *A63F 2300/636* (2013.01)

(58) Field of Classification Search
CPC ......... A63F 13/12; A63F 13/30; A63F 13/85; A63F 13/86; A63F 13/87; A63F 13/88
USPC ........................................................ 463/42
See application file for complete search history.

(56) References Cited

U.S. PATENT DOCUMENTS 6,023,729 A 2/2000 Samuel et al.
6,641,481 B1 * 11/2003 Mai et al. ..................... 463/42
(Continued)

FOREIGN PATENT DOCUMENTS

EP 1374959 A2 1/2004
EP 2503804 A1 9/2012
(Continued)

OTHER PUBLICATIONS

Manweiler, et al., "Switchboard: A Matchmaking System for Multiplayer Mobile Games", Retrieved at <<http://synrg.ee.duke.edu/papers/manweiler11switchboard.pdf>>, Proceedings of the 9th international conference on Mobile systems, applications, and services, Jun. 28, 2011, pp. 14.

(Continued)

*Primary Examiner* — Kevin Y Kim
(74) *Attorney, Agent, or Firm* — Aaron Chatterjee; Kate Drakos; Micky Minhas (57) ABSTRACT

Embodiments that relate to systems and methods for grouping players into a multiplayer game session are provided. In one embodiment, a first match request for a multiplayer game session is received and includes one or more requested player attributes. A plurality of other match requests are received, with one being a second match request including one or more requested player attributes. The first and second match requests are matched based on the requested player attributes. A notification of the match is sent to a client device of the first requesting player, with the notification configured to be received while the client device runs a user session different from the multiplayer game session. The notification includes a selectable element configured to instantiate the multiplayer game session on the client device in place of a user session when the selectable element is selected.

20 Claims, 5 Drawing Sheets

(51) Int. Cl.
  *G06F 17/00* (2006.01)
  *G06F 19/00* (2011.01)
  *A63F 13/30* (2014.01)

(56) References Cited

U.S. PATENT DOCUMENTS

| | | | |
|---|---|---|---|
| 7,614,955 B2 * | 11/2009 | Farnham et al. | 463/42 |
| 2002/0049086 A1 * | 4/2002 | Otsu | 463/42 |
| 2004/0097287 A1 | 5/2004 | Postrel | |
| 2006/0135264 A1 * | 6/2006 | Shaw et al. | 463/42 |
| 2006/0149818 A1 | 7/2006 | Odell et al. | |
| 2006/0287096 A1 | 12/2006 | O'Kelley, II et al. | |
| 2007/0173324 A1 | 7/2007 | Multerer et al. | |
| 2007/0173325 A1 * | 7/2007 | Shaw et al. | 463/42 |
| 2008/0242420 A1 * | 10/2008 | Graepel et al. | 463/42 |
| 2009/0017916 A1 * | 1/2009 | Blanchard et al. | 463/42 |
| 2012/0246301 A1 | 9/2012 | Vyrros et al. | |

FOREIGN PATENT DOCUMENTS

| | | | |
|---|---|---|---|
| EP | 2530907 A1 | 12/2012 | |
| WO | 9735258 A1 | 9/1997 | |

OTHER PUBLICATIONS

Riegelsberger, et al., "Personality Matters: Incorporating Detailed User Attributes and Preferences into the Matchmaking Process", Retrieved at <<http://research.microsoft.com/en-us/um/people/counts/pubs/profiles__and__matchmaking.pdf>>, Proceedings of the 40th Annual Hawaii International Conference on System Sciences (HICSS), Jan. 3, 2007, pp. 10.

Agarwal, et al., "Matchmaking for Online Games and Other Latency-Sensitive P2P Systems", Retrieved at <<http://research.microsoft.com/pubs/80856/sigcomm09-265.pdf>>, Proceedings of the ACM SIGCOMM conference on Data communication, Aug. 17, 2009, pp. 12.

ISA European Patent Office, International Search Report & Written Opinion for PCT/US2014/023406, WIPO, Aug. 18, 2014, 21 Pages.

"Matchmaking Rework FAQ", in forums of HeroesOfNewerth.com, http://forums.heroesofnewerth.com/showthread.php?365193-Matchmaking-Rework-FAQ, Dec. 5, 2011, 10 Pages.

"Counter-Strike: Global Offensive Update Released", Valve Corporation, http://store.steampowered.com/news/9207/, Oct. 25, 2012, 2 pages.

* cited by examiner

MATCHMAKING IN MULTIPLAYER GAMING

BACKGROUND

Multiplayer online games may allow players to search for other players and opponents online. In some examples, games and/or gaming systems may offer specific play areas in which a player may search for particular types of players. Such play areas, however, may create splits in the online population and/or result in long wait times.

In other examples, games and/or gaming systems may offer matchmaking services that use criteria provided by a player to search for other compatible players. With these services, however, a player may also experience long wait times while the system attempts to locate players who match the desired criteria. In these cases, to enable continued searching by the matchmaking service, the player seeking to be matched is forced to maintain the current user session of the particular game in which the matchmaking system is operating. This restricts the player from engaging in other games or activities while the system continues to search.

Some players may have very specific criteria for other compatible players. In these cases, and especially where the population of players for a given game is limited, wait times for locating a compatible player could be days, weeks or even months. Further, when the player seeking to be matched loses patience with waiting, the player may exit the current user session associated with the matchmaking system, thereby canceling the search.

SUMMARY

To address the above issues, systems and methods for grouping a plurality of players into a multiplayer game session of a multiplayer game are provided. In one example the method may include receiving a first match request for a multiplayer game session from a client device associated with a first requesting player, with the first match request including one or more of a plurality of requested player attributes. The first match request may be delivered to a multiplayer game hopper.

The method may include receiving a plurality of other match requests from client devices of other requesting players, with one of the plurality of other match requests being a second match request from a client device associated with a second requesting player. The second match request may include one or more of the plurality of requested player attributes. The method then includes matching the first match request with the second match request based on matching the requested player attributes in the first and second match requests, to thereby form a multiplayer game match.

A notification of the multiplayer game match is then sent to the client device associated with the first requesting player, with the notification configured to be received by the client device while the client device runs a user session that is different from the multiplayer game session. The notification may include a selectable element configured to instantiate on the client device the multiplayer game session in place of the user session when the selectable element is selected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

Figure 1:
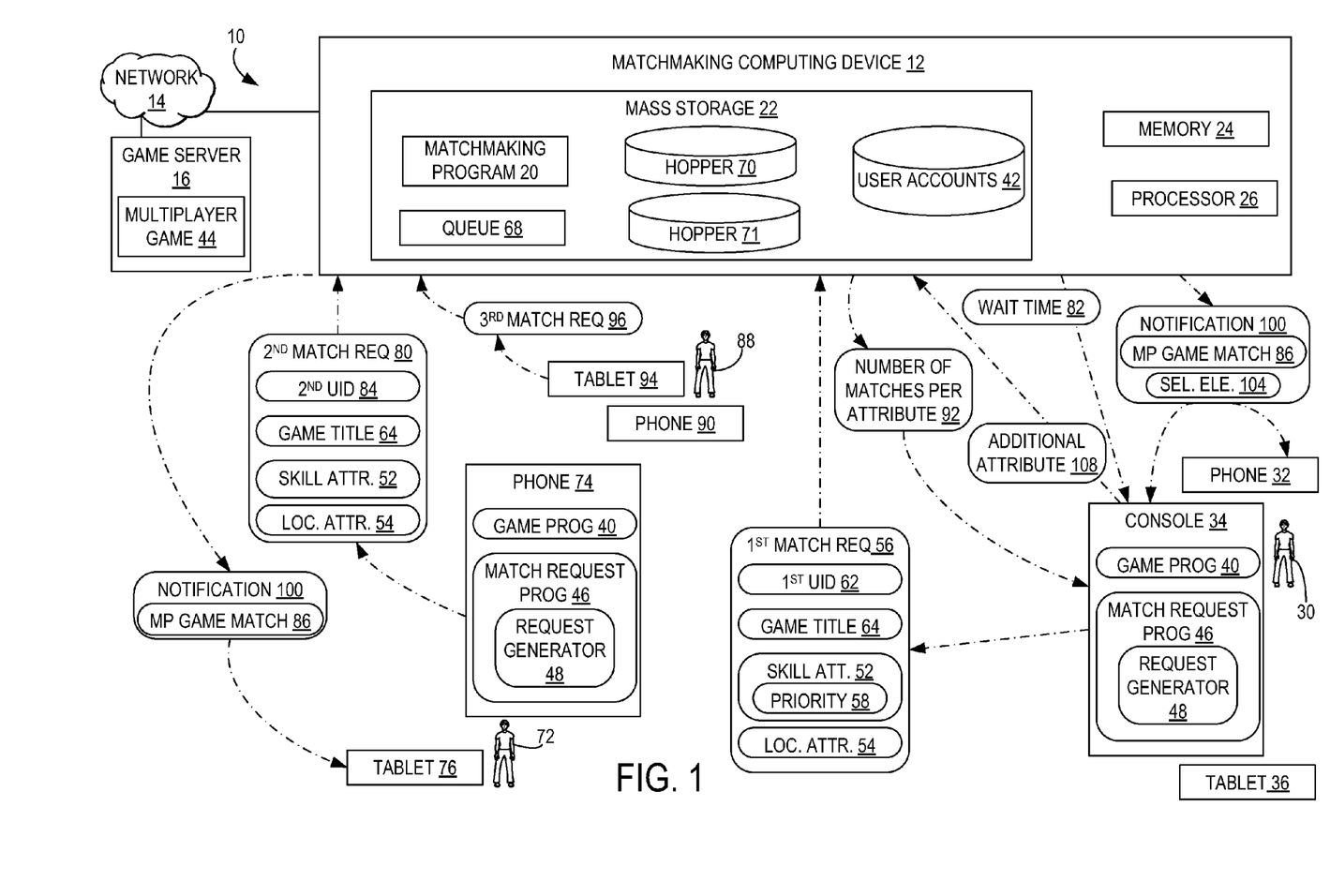
FIG. 1 is a schematic view of a multiplayer game matchmaking system according to an embodiment of the present disclosure.

FIG. 1 is a schematic view of one embodiment of multiplayer game matchmaking system 10 for grouping a plurality of players into a multiplayer game session of a multiplayer game. The multiplayer game matchmaking system 10 may include a matchmaking computing device 12 that may be communicatively coupled to a network 14. The network 14 may take the form of a local area network (LAN), wide area network (WAN), wired network, wireless network, personal area network, or a combination thereof, and may include the Internet. As described in more detail below, the matchmaking computing device 12 may communicate with a plurality of client computing devices and other computing devices, such as game server 16, console 34 and phone 74, via network 14.

The multiplayer game matchmaking system 10 may comprise a matchmaking program 20 that comprises instructions stored in mass storage 22 of the matchmaking computing device 12. The matchmaking program 20 may be loaded into memory 24 and executed by a processor 26 of the computing device 12 to perform one or more of the methods and processes described in more detail below.

The above-referenced matchmaking computing device 12 and client computing devices may take the form of network computing devices, servers, desktop computing devices, mobile computing devices such as smart phones, laptops, notebooks or tablet computers, home entertainment computers, interactive televisions, gaming consoles and systems, or other suitable type of computing device. The matchmaking computing device 12 and/or the client computing devices may include or be coupled with a display to present a visual representation of data held by a storage subsystem. Additional details regarding the components and computing aspects of the above-referenced computing devices are described in more detail below with reference to FIG. 4.

With continued reference to FIG. 1, a first requesting player 30 may have access to several computing devices, including a mobile phone 32, a gaming console 34 and a tablet computer 36. The console 34 may include a multiplayer game program 40 configured to execute one or more multiplayer games, such as multiplayer game 44 hosted by game server 16. In some examples, the mobile phone 32 and tablet computer 36 may also include the multiplayer game program 40 and/or other game programs.

The console 34 may also include a match request program 46 configured to interact with the matchmaking program 20 as described in more detail below. The match request program 46 may include a request generator 48 configured to generate match requests that include one or more requested player attributes. A match request including one or more requested player attributes may then be sent by the console 34 to the matchmaking program 20 via network 14.

Requested player attributes that may be included in a match request may comprise player attributes of other players that are desired by the requesting player 30. The player attributes may include, but are not limited to, an age range, gender, location, marital status, language, skill level, player reputation, style of play, game configuration setting, game add-on content, title, and computing platform. It will be appreciated that an age range may comprise, for example, 12-16, 18-24, 20-30, over 60, and any other suitable range, and may include single years, such as 32. It will also be appreciated that a location may comprise a current participant location and/or a predefined participant location, such as a city.

In one example, one or more requested player attributes may be defined by a developer of the multiplayer game 44. In another example, one or more requested player attributes may be defined by a requesting player. In still another example, one or more requested player attributes may be defined by the multiplayer game matchmaking system 10.

In one use case example, the first requesting player 30 may desire to participate in a multiplayer game session of the multiplayer game 44. The first requesting player 30 may further desire to play with other participants who have a skill level of 9 out of 10 (skill attribute 52) in the multiplayer game 44, and who live in Santa Clara County, California (location attribute 54). The first requesting player 30 may input these requested player attributes into the match request program 46 via the console 34. The request generator 48 may create a first match request 56 that includes the skill attribute 52 and the location attribute 54. In some examples, and as discussed in more detail below, the first match request 56 may also include a priority 58 assigned to one or more of the requested player attributes.

The first match request 56 may also include a game title 64 that identifies the multiplayer game 44 that the first requesting player 30 would like to play. The first match request 56 may also include a first user ID 62 that identifies the console 34 and/or one or more player attributes of the first requesting player 30. In some examples the first user ID 62 may include additional information related to the first requesting player 30, such as user profile information, subscription information related to the multiplayer game matchmaking system, etc.

In some examples, and as discussed in more detail below, after submitting the first match request 56 the first requesting player 30 may run a user session that is different from a multiplayer game session of the multiplayer game 44. In other words, while the player's match request is pending at the multiplayer matchmaking system 10, the player is not forced to wait with the multiplayer game session running. Advantageously, by performing the matchmaking services in the background, the multiplayer matchmaking system 10 frees the player to perform other tasks, play other games, power down the console, etc.

Upon receiving the first match request 56, the matchmaking program 20 may place the first match request in a queue 68 containing other match requests received from other requesting players. From the queue 68 the first match request 56 may be delivered to a hopper 70 that corresponds to the multiplayer game 44 and has been defined by a developer of the multiplayer game 44. In one example, a match request for a particular multiplayer game may reside only in the hopper corresponding to that multiplayer game. It will be appreciated that the multiplayer game matchmaking system 10 may include one or more other hoppers, such as hopper 71, that correspond to other multiplayer games. Additionally, in some examples a single hopper may match various players across multiple different games or versions of games, thereby enabling such players to play together in a single user session. In some examples, a hopper may comprise an entity that contains logic for grouping match requests together based on rules of the hopper and attributes of the requests.

A second requesting player 72 may also desire to participate in a multiplayer game session of the multiplayer game 44. The second requesting player may also have several computing devices, including a mobile phone 74 and a tablet computer 76. The mobile phone 74 may include the multiplayer game program 40 and the match request program 46 including the request generator 48.

The second requesting player 72 may also desire to play with other participants who have a skill level of 9 out of 10 (skill attribute 52) and live in Santa Clara County, California (location attribute 54). The request generator 48 may create a second match request 80 that includes the skill attribute 52 and the location attribute 54. In one example, the second match request 80 may not include a priority assigned to one or more of the requested player attributes. The second match request 80 may also include game title 64 and a second user ID 84 that identifies the phone 74 and/or one or more player attributes of the second requesting player 72.

Similarly, a third requesting player 88 may also desire to participate in a multiplayer game session of the multiplayer game 44. The third requesting player 88 may have a mobile phone 90 and a tablet computer 94. The tablet computer 94 may include the multiplayer game program and the match request program including the request generator. The request generator may create a third match request 96 that includes one or more requested player attributes desired by the third requesting player 88. In one example, one or more of these requested attributes may be different from skill attribute 52 and location attribute 54 included in the first match request 56 and the second match request 80.

Upon receiving the second match request 80, the matchmaking program 20 may place the second match request in the queue 68. From the queue 68 the second match request 80 is then delivered to hopper 70 that corresponds to the multiplayer game 44. The matchmaking program 20 may then match the first match request 56 with the second match request 80 based on matching the requested player attributes in the first and second match requests, to thereby form a multiplayer game match 86.

In one example, matching the first match request 56 with the second match request 80 based on matching the requested player attributes may comprise matching one or more requested player attributes in the first match request 56 with one or more player attributes associated with the second requesting player 72. Such a player attribute may be included, for example, in the $2^{nd}$ user ID 84 in the second match request 80. For example, where the second requesting player has a skill level of 9 out of 10, and the first match request includes skill attribute 52 corresponding to a skill level of 9 out of 10, then the matchmaking program 20 may match the first match request 56 with the second match request 80 based at least in part on these matching skill attributes.

Upon matching the first match request 56 to the second match request 80, the matchmaking program 20 may send a notification 100 of the multiplayer game match 86 to the console 34 associated with the first requesting player 30. Advantageously, and as noted above, the notification may be configured to be received by the console 34 while the console runs a user session that is different from the multiplayer game session. Further, and as described in more detail below, the notification 100 may include a selectable element 104 that is configured to instantiate on the console 34 the multiplayer game session requested via the first match request 56. In some examples a notification of the multiplayer game match 86 may also be sent to the second requesting player 72 and/or other players associated with the multiplayer game session.

Figure 2:
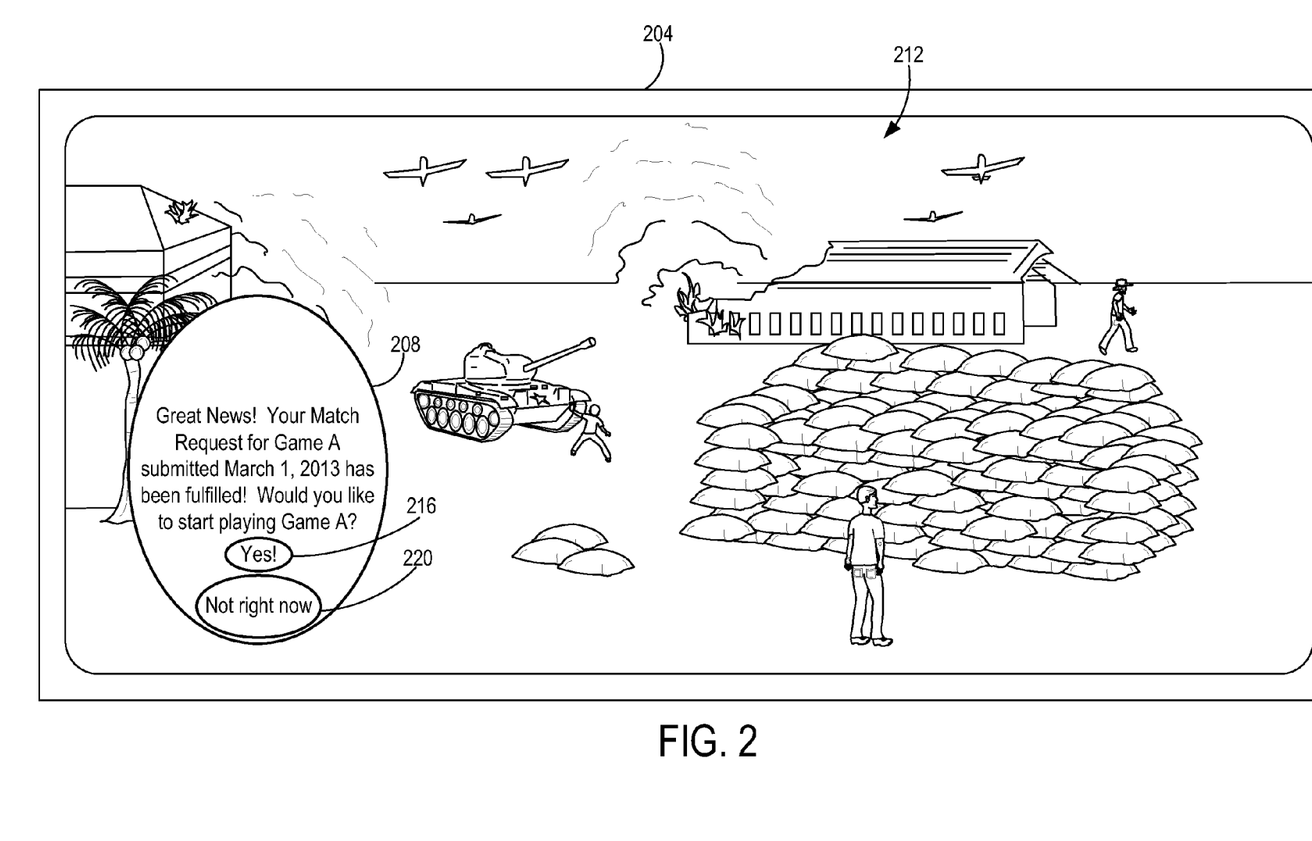
FIG. 2 is a schematic illustration of a display on which a notification of a multiplayer game match is displayed over a user session of a game.

With reference now to FIG. 2, an example display 204 is schematically illustrated. It will be appreciated that in the various example use cases discussed herein, the display 204 may be communicatively coupled to the phone 32, console 34, tablet computer 36, or any of the other computing devices illustrated in FIG. 1 and associated with a requesting player.

In one example, after submitting the first match request 56 to participate in a multiplayer game session of the multiplayer game 44, with such match request including particular requested player attributes, the first requesting player 30 may then initiate a separate game session of the same multiplayer game 44 while waiting to be matched via the first match request. For example and with reference to FIG. 2, the first requesting player 30 may join an instantiation of an existing game session of the multiplayer game 44, generally indicated at 212. When the first match request 56 is matched to the second match request 80 and the notification 100 is sent, the notification 100 may be configured to be received and presented to the first requesting player 30 via the console 34 and display 204 while the console runs the existing game session 212.

As shown in FIG. 2, in one example the notification may comprise a dialogue bubble 208 that is displayed on the display 204 along with images generated in the existing game session 212. The bubble 208 may contain text alerting the requesting player 30 that the player's match request for the multiplayer game session (denoted "Game A") has been fulfilled. The bubble 208 may include a selectable element in the form of a "Yes" button 216 that, when selected, instantiates the multiplayer game session requested via the first match request 56 in place of the existing game session 212. The bubble 208 may also include a "Not right now" button 220 that, when selected, does not instantiate the multiplayer game session and removes the bubble from the existing game session 212. It will also be appreciated that the notification 100 may take other forms such as, for example, an icon displayed on display 204, an audible alert sounded by the client device, an email message sent to an email account of the requesting user, a text message, or any other suitable form.

In another example, after submitting the first match request 56 the first requesting player 30 may join an instantiation of an existing user session of another game that is different from multiplayer game 44. When the first match request 56 is matched to the second match request 80 and the notification 100 is sent, the notification 100 may be configured to be received and presented to the first requesting player 30 via the console 34 and display 204 while the console runs the existing user session of the other game.

It will be appreciated that by utilizing the matchmaking program 20 to perform the matchmaking activities, such activities may be performed in the background with respect to the client device and any user sessions running on the client device. Accordingly, after submitting a match request the requesting player may be free to instantiate any other user sessions of other games or programs, utilize the client device for other activities, or even power down the device.

In another example, the first match request 56 may be generated programmatically by the match request program 46. For example, when the first requesting player 30 launches the game program 40 and a user session of the multiplayer game 44, the match request program 46 may programmatically generate the first match request 56. In one example, the match request program 46 may utilize one or more player attributes of the first requesting player 30 to programmatically formulate a first match request 56 that seeks to match the first requesting player with one or more other players who have the same or similar attributes. Advantageously, if the first match request 56 is satisfied, the first requesting player 30 may be presented with an opportunity to play a game with other players who were matched to the first requesting player via one or more player attributes of the first requesting player.

In another example, in addition to sending the notification 100 to the console 34 from which the first match request 56 was sent, the matchmaking system 10 may send the notification 100 to one or more other devices associated with the first requesting player 30. As shown in the example in FIG. 1, the notification 100 may also be sent to the mobile phone 32 associated with the first requesting player 30. Advantageously, in this manner the first requesting player 30 may receive the notification 100 even if the player has powered down the console 34 or is not located at the console.

In another example, and instead of sending the notification 100 to the console 34, the matchmaking system 10 may send the notification 100 to one or more other devices associated with the first requesting player 30. In one example, the matchmaking program 20 may determine that the first requesting player 30 may not be able to receive a notification at the console 34. For example, the matchmaking program 20 may determine that the console 34 is located at a first location and the mobile phone 32 is currently at a different location, via geo-locating techniques such as global positioning systems (GPS). In this example, the matchmaking program 20 may send the notification 100 to the mobile phone 32, which is typically in the player's possession. It will also be appreciated that in some examples, the notification 100 may be configured to be multi-platform, such that the notification may be received and implemented at both the console 34 running on a first computing platform and the mobile phone 32 running on a second, different computing platform.

In some situations, and depending upon the specificity and/or other characteristics of the match request, the waiting time associated with the matchmaking system 10 forming a multiplayer game match based on the first match request 56 may grow undesirably long. In one example, the matchmaking program 20 may programmatically modify the first match request 56 upon expiration of a threshold period of time after receipt of the first match request, to thereby increase a likelihood of matching the first match request with one or more of the plurality of other match requests.

For example, where the threshold period of time is 1 week and this threshold time period expires, the matchmaking program 20 may modify one or more of the requested player attributes in the first match request 56 to be more inclusive of other requesting players. In one example, where the skill attribute 52 is exactly 9 out of 10, this attribute may be modified to be at least 9 out of 10, and thereby capture players with either a skill level of 9 or 10. It will be appreciated that such modifications may take many different forms that function to broaden the scope of other requesting player candidates potentially available for matching. It will also be appreciated that the threshold period of time may be any other suitable period of time such as, for example, 30 seconds, 1 minute, 10 minutes, 1 hour, 1 day, 1 month, or any other period of time.

In another example, the matchmaking program 20 may determine that the requested player attributes of a match request are too specific to generate a match within a threshold period of time. In this example, the matchmaking program 20 may notify the requesting player accordingly, and may suggest that the player modify the match request to broaden the scope of other requesting player candidates potentially available for matching.

In another example, the first match request 56 may include a priority 58 associated with at least one of the one or more requested player attributes. In the example shown in FIG. 1, the first requesting player 30 may have a strong desire to play the multiplayer game 44 with other players having a skill attribute 52 of 9 out of 10. Accordingly, the first requesting player may assign to the skill attribute 52 a highest priority 58 of 3 out of 3. Based on this priority 58 the matchmaking program may then give the skill attribute 52 a higher priority than the location attribute 54 in the process of matching the first match request 56 with another match request. In other examples, a priority may be specified for a match request as a part of the rules of a hopper.

In another example, the matchmaking program 20 may estimate a wait time 82 for matching the first match request 56 with one or more of the plurality of other match requests. In performing such an estimation, the matchmaking program 20 may, for example, analyze one or more characteristics of the first match request 56, such as the types of requested player attributes included, the generality or specificity of each requested player attribute, the number of other match requests in hopper 70, etc. In other examples, estimating a wait time may include analyzing historical factors, such as what match requests have existed in the past at this time of day in this hopper. Once the estimated wait time 82 is determined, the matchmaking program 20 may provide the wait time to the console 34 for presentation to the first requesting player 30.

In another example, after the first match request 56 has been sent, the first requesting player 30 may send an additional requested player attribute 108 to be included with the first match request and utilized in making the multiplayer game match. For example, the additional requested player attribute 108 may include a player reputation attribute. Upon receiving the additional player attribute 108, the matchmaking program 20 may recalculate the wait time 82 based on the additional requested player attribute.

In another example, the matchmaking program 20 may calculate a number of matches 92 associated with each of the one or more requested player attributes in the first match request. For example, the first match request 56 may include a skill attribute 52 of 10 out of 10 and a location attribute 54 of Ladysmith, Wis. The matchmaking program 20 may determine that currently in hopper 70 there are 5,212 match requests that include a skill attribute 52 of 10 out of 10, and there are 2 match requests that include a location attribute 54 of Ladysmith, Wis. The matchmaking program 20 may further determine that neither of the 2 match requests that include the location attribute 54 also include the desired skill attribute 52, resulting in a null set. The matchmaking program 20 may then provide these numbers of matches 92 per attribute to the console 34. Accordingly, upon seeing that there are only 2 match requests that include a location attribute 54 of Ladysmith, Wis., the first requesting player 30 may choose to modify this or the other requested player attribute in the first match request 56. In other examples, a total number of players associated with the match requests in a hopper may be calculated, which may provide an indication of the popularity of that hopper.

In another example, a collection of two or more players may submit a group match request to the matchmaking system 10 to be matched as a group. For example, a group of 4 players may desire to play a multi-player adventure game on a newly released map. The game may call for a minimum of 16 players. One of the collection of players may submit to the matchmaking system 10 a group match request that includes all 4 of the players, thereby ensuring that all 4 players will be matched in the same user session of the game.

In some examples, the matchmaking program 20 may evaluate one or more quality of service parameters related to the requested multiplayer game session prior to sending a notification of a multiplayer game match to a requesting player. Where one or more quality of service parameters are below a predetermined threshold linked to a minimum acceptable user experience, the matchmaking program 20 may refrain from sending the notification until the quality of service parameters meet or exceed the corresponding threshold. Examples of quality of service parameters that may be evaluated include, but are not limited to, a data throughput rate, elapsed time in sender-receiver transmissions (transit delay), variation allowed in transit delay (delay jitter), ratio of incorrectly received or lost data (error rate), and a minimum number of players in a game session that receive each item of data (degree of reliability).

In some examples, the matchmaking program 20 may also enable a requesting player to prevent the program from matching the player with other players who are undesirable to the requesting player. For example, such other players may include players the requesting player has avoided in the past, and players with whom the requesting player is forbidden to play via, for example, parental controls.

It will be appreciated that one or more portions or the entirety of the matchmaking program 20 and other software associated with the matchmaking system 10 may reside in the matchmaking computing device 12 to form a server-client network with the client devices, or on each of the client devices to form a peer-to-peer network. In other examples a hybrid model having both server-client and peer-to-peer characteristics may be utilized.

Figure 3A:
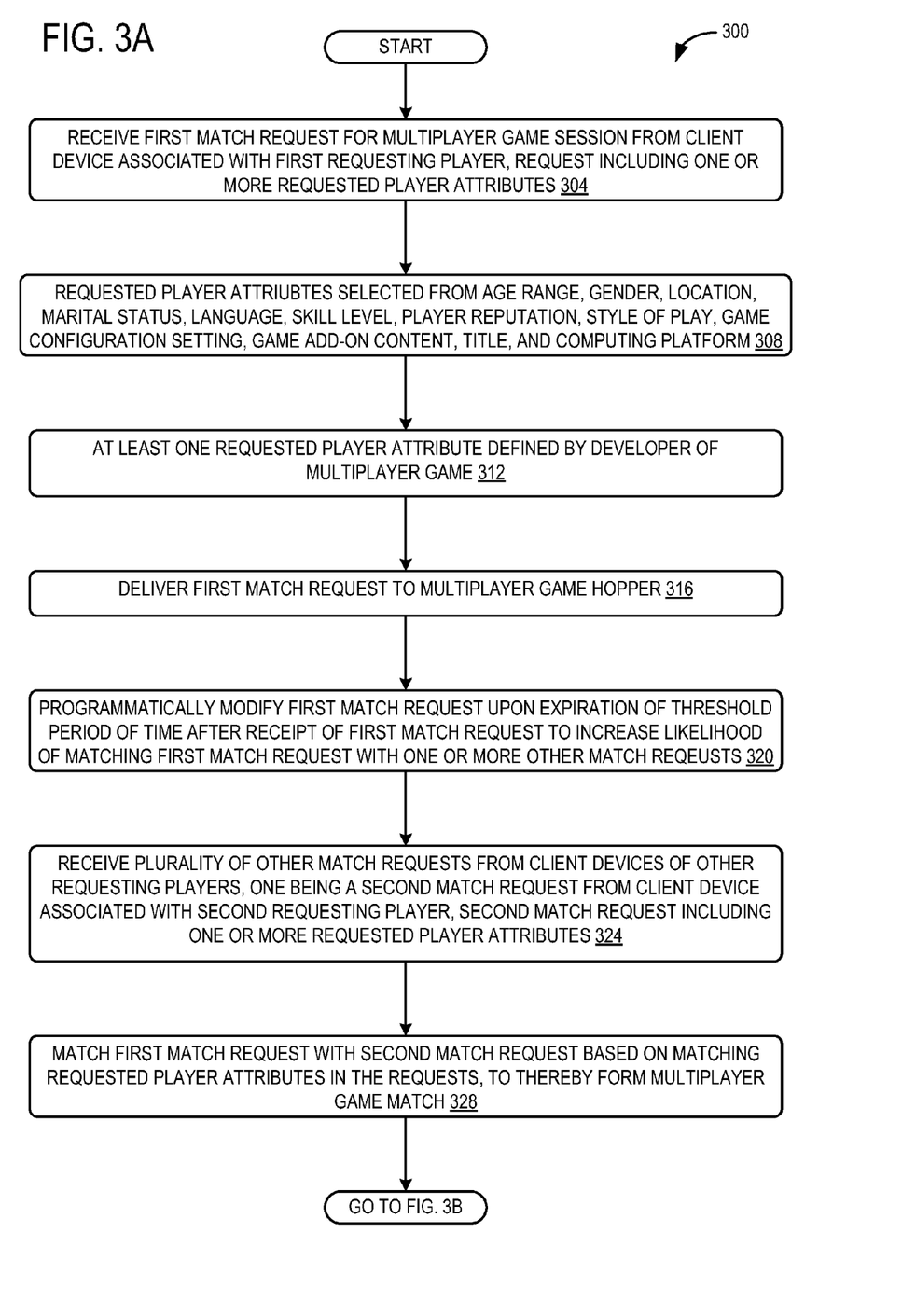
FIGS. 3A-3C are a flow chart of a method for grouping a plurality of players into a multiplayer game session according to an embodiment of the present disclosure.
Figure 3B:
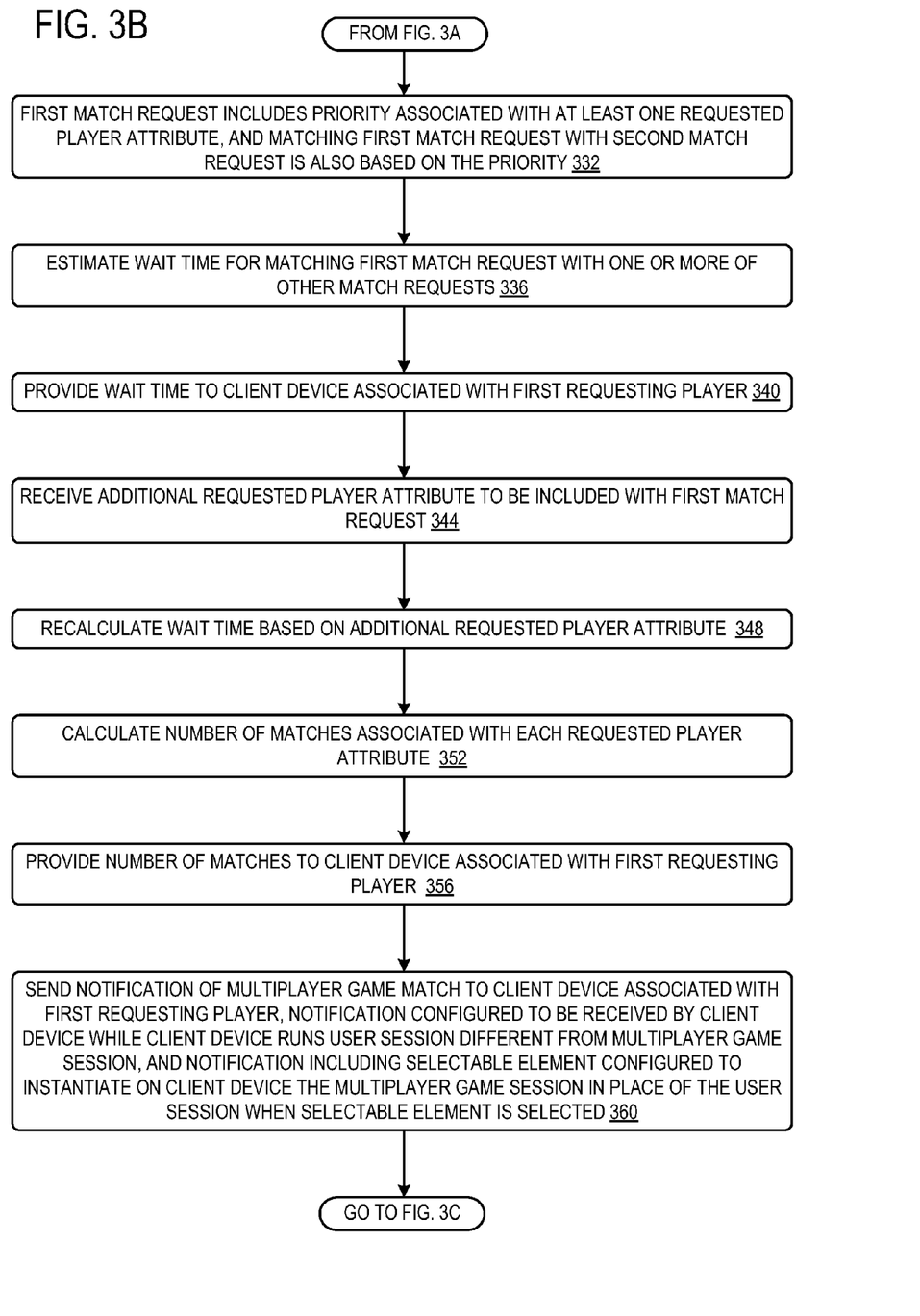
Figure 3C:
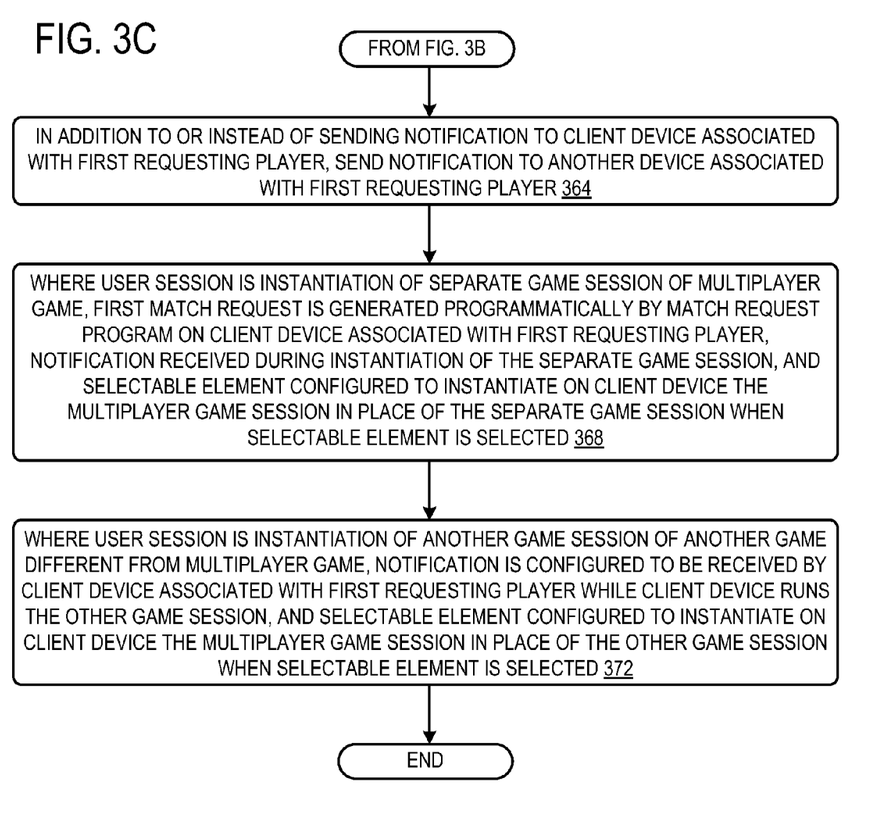

FIGS. 3A, 3B and 3C illustrate a flow chart of a method 300 for grouping a plurality of players into a multiplayer game session of a multiplayer game according to an embodiment of the present disclosure. The following description of method 300 is provided with reference to the software and hardware components of the multiplayer game matchmaking system 10 described above and shown in FIGS. 1 and 2. It will be appreciated that method 300 may also be performed in other contexts using other suitable hardware and software components.

At 304 the method 300 includes receiving a first match request for the multiplayer game session from a client device associated with a first requesting player, with the first match request including one or more requested player attributes. At 308 the requested player attributes may be selected from an age range, gender, location, marital status, language, skill level, player reputation, style of play, game configuration setting, game add-on content, title, and computing platform.

At 312 at least one of the requested player attributes may be defined by a developer of the multiplayer game. At 316 the method 300 includes delivering the first match request to a multiplayer game hopper. At 320 the method 300 includes programmatically modifying the first match request upon expiration of a threshold period of time after receipt of the first match request to increase a likelihood of matching the first match request with one or more of the plurality of other match requests. At 324 the method 300 includes receiving a plurality of other match requests from client devices of other requesting players, where one of the plurality of other match requests is a second match request from a client device associated with a second requesting player, and the second match request includes one or more of the requested player attributes.

At 328 the method 300 includes matching the first match request with the second match request based on matching the requested player attributes in the first and second match requests, to thereby form a multiplayer game match. With reference now to FIG. 3B, at 332 the first match request may include a priority associated with at least one of the one or more requested player attributes, and matching the first match request with the second match request is also based on the priority. At 336 the method 300 includes estimating a wait time for matching the first match request with one or more of the plurality of other match requests. At 340 the method 300 includes providing the wait time to the client device associated with the first requesting player.

At 344 the method 300 includes receiving an additional requested player attribute to be included with the first match request. At 348 the method 300 includes recalculating the wait time based on the additional requested player attribute. At 352 the method 300 includes calculating a number of matches associated with each of the one or more requested player attributes. At 356 the method 300 includes providing the number of matches to the client device associated with the first requesting player. At 360 the method 300 includes sending a notification of the multiplayer game match to the client device associated with the first requesting player, where the notification is configured to be received by the client device while the client device runs a user session that is different from the multiplayer game session. The notification also includes a selectable element configured to instantiate on the client device the multiplayer game session in place of the user session when the selectable element is selected.

With reference now to FIG. 3C, in addition to or instead of sending the notification to the client device associated with the first requesting player and from which the first match request was received, at 364 the method 300 includes sending the notification to another device associated with the first requesting player. At 368, the user session may comprise an instantiation of a separate game session of the multiplayer game, the first match request may be generated programmatically by a match request program on the client device associated with the first requesting player, the notification may be received during the instantiation of the separate game session, and the selectable element may configured to instantiate on the client device the multiplayer game session in place of the separate game session when the selectable element is selected.

At 372, the user session may comprise an instantiation of another game session of another game different from the multiplayer game, the notification may be received during the instantiation of the separate game session, and the selectable element may configured to instantiate on the client device the multiplayer game session in place of the separate game session when the selectable element is selected.

It will be appreciated that method 300 is provided by way of example and is not meant to be limiting. Therefore, it is to be understood that method 300 may include additional and/or alternative steps than those illustrated in FIGS. 3A, 3B and 3C. Further, it is to be understood that method 300 may be performed in any suitable order. Further still, it is to be understood that one or more steps may be omitted from method 300 without departing from the scope of this disclosure.

Figure 4:
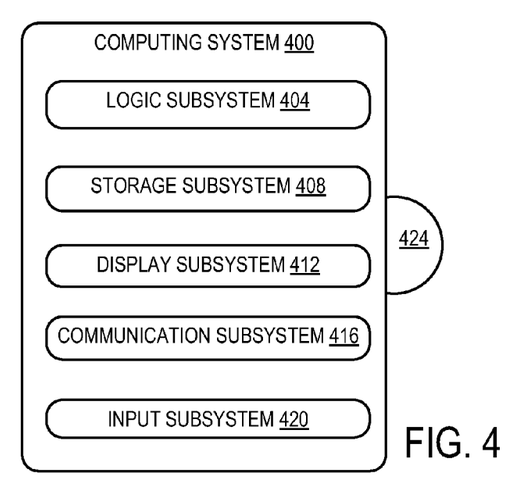
FIG. 4 is a simplified schematic illustration of an embodiment of a computing device.

FIG. 4 schematically shows a nonlimiting embodiment of a computing system 400 that may perform one or more of the above described methods and processes. Matchmaking computing device 12 and each of the client computing devices described above may take the form of computing system 400. Computing system 400 is shown in simplified form. It is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, etc.

As shown in FIG. 4, computing system 400 includes a logic subsystem 404 and a storage subsystem 408. Computing system 400 may optionally include a display subsystem 412, a communication subsystem 416, an input subsystem 420 and/or other subsystems and components not shown in FIG. 4. Computing system 400 may also include computer readable media, with the computer readable media including computer readable storage media and computer readable communication media. Computing system 400 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 404 may include one or more physical devices configured to execute one or more instructions. For example, the logic subsystem 404 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 404 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 408 may include one or more physical, persistent devices configured to hold data and/or instructions executable by the logic subsystem 404 to implement the herein described methods and processes. When such methods and processes are implemented, the state of storage subsystem 408 may be transformed (e.g., to hold different data).

Storage subsystem 408 may include removable media and/or built-in devices. Storage subsystem 408 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 408 may include devices with one or more of the following characteristics: volatile, nonvolatile, dynamic, static, read/write, read-only, random access, sequential access, location addressable, file addressable, and content addressable.

In some embodiments, aspects of logic subsystem 404 and storage subsystem 408 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 4 also shows an aspect of the storage subsystem 408 in the form of removable computer readable storage media 424, which may be used to store data and/or instructions executable to implement the methods and processes described herein. Removable computer-readable storage media 424 may take the form of CDs, DVDs, HD-DVDs, Blu-Ray Discs, EEPROMs, and/or floppy disks, among others.

It is to be appreciated that storage subsystem 408 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 412 may be used to present a visual representation of data held by storage subsystem 408. As the above described methods and processes change the data held by the storage subsystem 408, and thus transform the state of the storage subsystem, the state of the display subsystem 412 may likewise be transformed to visually represent changes in the underlying data. The display subsystem 412 may include one or more display devices, such as display 204 described above, utilizing virtually any type of technology. Such display devices may be combined with logic subsystem 404 and/or storage subsystem 408 in a shared enclosure, or such display devices may be peripheral display devices.

When included, communication subsystem 416 may be configured to communicatively couple computing system 400 with one or more networks and/or one or more other computing devices. Communication subsystem 416 may include wired and/or wireless communication devices compatible with one or more different communication protocols. As nonlimiting examples, the communication subsystem 416 may be configured for communication via a wireless telephone network, a wireless local area network, a wired local area network, a wireless wide area network, a wired wide area network, etc. In some embodiments, the communication subsystem may allow computing system 400 to send and/or receive messages to and/or from other devices via a network such as the Internet.

When included, input subsystem 420 may comprise or interface with one or more sensors or user-input devices such as a game controller, gesture input detection device, voice recognizer, inertial measurement unit, keyboard, mouse, or touch screen. In some embodiments, the input subsystem 420 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The terms "module" and "program" may be used to describe an aspect of the multiplayer game matchmaking system 10 that is implemented to perform one or more particular functions. In some cases, such a module or program may be instantiated via logic subsystem 404 executing instructions held by storage subsystem 408. It is to be understood that different modules and programs may be instantiated from the same application, service, code block, object, library, routine, API, function, etc. Likewise, the same module or program may be instantiated by different applications, services, code blocks, objects, routines, APIs, functions, etc. The terms "module" and "program" are meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for grouping a plurality of players into a multiplayer game session of a multiplayer game served by a game server device, comprising:
  receiving at a matchmaking computing device a first match request for a multiplayer game session to be served by the game server device that is independent of the matchmaking computing device, the first match request being received from a first requesting player user session of a match request generation program executed on a first client device, the first match request including one or more of a plurality of requested player attributes;
  delivering the first match request from the first client device associated with the first requesting player to a multiplayer game hopper that is instantiated on the matchmaking computing device;
  receiving at the matchmaking computing device a plurality of other match requests for a multiplayer game session on the game server from client devices of other requesting players, one of the plurality of other match requests being a second match request from a second client device associated with a second requesting player, the second match request including one or more of the plurality of requested player attributes;
  matching the first match request with the second match request at the matchmaking computing device based on matching the requested player attributes in the first and second match requests, to thereby form a multiplayer game match; and sending a notification of the multiplayer game match from the matchmaking computing device to the first client device associated with the first requesting player, the notification configured to be received by the first client device while the first client device runs the user session of the matchmaking request generation program, concurrently with a multiplayer game program, which is configured to execute the multiplayer game session hosted by the game server, and which is different and operates independently from the matchmaking request generation program, and the notification including a selectable element configured to instantiate on the client device the multiplayer game session in place of the user session of the matchmaking system when the selectable element is selected.

2. The method of claim 1, further comprising programmatically modifying the first match request upon expiration of a threshold period of time after receipt of the first match request to increase a likelihood of matching the first match request with one or more of the plurality of other match requests.

3. The method of claim 1, wherein the requested player attributes are selected from the group consisting of an age range, gender, location, marital status, language, skill level, player reputation, style of play, game configuration setting, game add-on content, title, and computing platform.

4. The method of claim 1, wherein at least one of the requested player attributes is defined by a developer of the multiplayer game.

5. The method of claim 1, wherein the first match request includes a priority associated with at least one of the one or more requested player attributes, and matching the first match request with the second match request is also based on the priority.

6. The method of claim 1, further comprising:
estimating a wait time for matching the first match request with one or more of the plurality of other match requests; and
providing the wait time to the client device associated with the first requesting player.

7. The method of claim 6, further comprising:
receiving an additional requested player attribute to be included with the first match request; and
recalculating the wait time based on the additional requested player attribute.

8. The method of claim 1, wherein in addition to or instead of sending the notification to the client device associated with the first requesting player, the method further comprises sending the notification to another device associated with the first requesting player.

9. The method of claim 1, further comprising:
calculating a number of matches associated with each of the one or more requested player attributes of the first match request; and
providing the number of matches to the client device associated with the first requesting player.

10. The method of claim 1, wherein the user session comprises an instantiation of a separate game session of the multiplayer game, the first match request is generated programmatically by a match request program on the client device associated with the first requesting player, the notification is received during the instantiation of the separate game session, and the selectable element is configured to instantiate on the client device the multiplayer game session in place of the separate game session when the selectable element is selected.

11. A multiplayer game matchmaking system for grouping a plurality of players into a multiplayer game session of a multiplayer game, the multiplayer game matchmaking system comprising:
a matchmaking program comprising instructions stored in a mass storage of the multiplayer game matchmaking system, the matchmaking program configured to:
receive at the matchmaking computing device a first match request for a multiplayer game session to be served by the game server device that is independent of the matchmaking computing device, the first match request being received from a first requesting player user session of a match request generation program executed on a first client device, the first match request including one or more of a plurality of requested player attributes;
deliver the first match request from the client device associated with the first requesting player to a multiplayer game hopper that is instantiated on the matchmaking computing device;
receive on the matchmaking computing device a plurality of other match requests for a multiplayer game session on the game server from client devices of other requesting players, one of the plurality of other match requests being a second match request from a second client device associated with a second requesting player, the second match request including one or more of the plurality of requested player attributes;
match the first match request with the second match request at the matchmaking computing device based on matching the requested player attributes in the first and second match requests, to thereby form a multiplayer game match; and
send a notification of the multiplayer game match from the matchmaking computing device to the first client device of the first requesting player, the notification configured to be received by the first client device while the first client device runs the user session of the matchmaking request generation program, concurrently with a multiplayer game program, which is configured to execute the multiplayer game session hosted by the game server, and which is different and operates independently from the matchmaking request generation program, and the notification including a selectable element configured to instantiate on the client device the multiplayer game session in place of the user session of the matchmaking system when the selectable element is selected.

12. The multiplayer game matchmaking system of claim 11, wherein the matchmaking program is further configured to programmatically modify the first match request upon expiration of a threshold period of time after receipt of the first match request to increase a likelihood of matching the first match request with one or more of the plurality of other match requests.

13. The multiplayer game matchmaking system of claim 11, wherein the first match request includes a priority associated with at least one of the one or more requested player attributes, and the matchmaking program is further configured to match the first match request with the second match request based also on the priority.

14. The multiplayer game matchmaking system of claim 11, wherein the matchmaking program is further configured to:

estimate a wait time for matching the first match request with one or more of the plurality of other match requests; and provide the wait time to the client device associated with the first requesting player.

15. The multiplayer game matchmaking system of claim 14, wherein the matchmaking program is further configured to:

receive an additional requested player attribute to be included with the first match request; and recalculate the wait time based on the additional requested player attribute.

16. The multiplayer game matchmaking system of claim 11, wherein in addition to or instead of sending the notification to the first client device, the matchmaking program is further configured to send the notification to another device associated with the first requesting player.

17. The multiplayer game matchmaking system of claim 11, wherein the matchmaking program is further configured to:

calculate a number of matches associated with each of the one or more requested player attributes of the first match request; and provide the number of matches to the client device associated with the first requesting player.

18. The multiplayer game matchmaking system of claim 11, wherein the user session comprises an instantiation of a separate game session of the multiplayer game, the first match request is generated programmatically by the multiplayer game on the client device associated with the first requesting player, the first match request received during the instantiation of the separate game session, and the selectable element is configured to instantiate on the client device the multiplayer game session in place of the separate game session when the selectable element is selected.

19. The multiplayer game matchmaking system of claim 11, wherein the user session comprises an instantiation of another game session of another game that is different from the multiplayer game, the notification is configured to be received by the client device associated with the first requesting player while the client device runs the other game session, and the selectable element is configured to instantiate on the client device the multiplayer game session in place of the other game session when the selectable element is selected.

20. A method for grouping a plurality of players into a multiplayer game session of a multiplayer game served by a game server device, comprising:

receiving at a matchmaking computing device a first match request for a multiplayer game session to be served by the game server device that is independent of the matchmaking computing device, the first match request being received from a first requesting player user session of a match request generation program executed on a first client device, the first match request including one or more requested player attributes;

delivering the first match request from the client device associated with the first requesting player to a multiplayer game hopper that is instantiated on the matchmaking computing device;

receiving at the matchmaking computing device a plurality of other match requests for a multiplayer game session on the game server from client devices of other requesting players, one of the plurality of other match requests being a second match request from a second client device associated with a second requesting player, the second match request including one or more of the requested player attributes;

matching the first match request with the second match request at the matchmaking computing device based on matching the requested player attributes in the first and second match requests, to thereby form a multiplayer game match; and sending a notification of the multiplayer game match from the matchmaking computing device to another client device associated with the first requesting player, the notification configured to be received by the other client device while the other client device runs the user session of the matchmaking request generation program, concurrently with a multiplayer game program, which is configured to execute the multiplayer game session hosted by the game server, and which is different and operates independently from the matchmaking request generation program, and the notification including a selectable element configured to instantiate on the other client device the multiplayer game session in place of the other user session of the matchmaking system when the selectable element is selected.

* * * * *